United States Patent
Islam et al.

(10) Patent No.: US 6,269,540 B1
(45) Date of Patent: Aug. 7, 2001

(54) PROCESS FOR MANUFACTURING OR REPAIRING TURBINE ENGINE OR COMPRESSOR COMPONENTS

(75) Inventors: Mahmud U. Islam; Lijue Xue; Gavin McGregor, all of London (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 09/408,853

(22) Filed: Sep. 30, 1999

Related U.S. Application Data

(60) Provisional application No. 60/103,052, filed on Oct. 5, 1998.

(51) Int. Cl.[7] .................................................. B23P 15/00
(52) U.S. Cl. ................... 29/889.7; 29/889.1; 29/889.71; 29/889.72; 29/402.18
(58) Field of Search ................... 29/889.1, 889.7, 29/889.71, 889.72, 402.09, 402.16, 402.18; 219/121.6, 121.66, 121.85; 427/596, 597

(56) References Cited

U.S. PATENT DOCUMENTS

| | | | |
|---|---|---|---|
| 4,300,474 | * 11/1981 | Livsey | 219/121.63 |
| 5,038,014 | 8/1991 | Pratt et al. | 219/121.64 |
| 5,160,822 | * 11/1992 | Aleshin | 219/121.64 |
| 5,731,046 | * 3/1998 | Mistry et al. | 427/596 |
| 5,837,960 | * 11/1998 | Lewis et al. | 219/121.63 |
| 5,900,170 | * 5/1999 | Marcin, Jr. et al. | 219/121.66 |
| 5,945,013 | * 8/1999 | LaFave | 29/889.1 |
| 6,034,344 | * 3/2000 | Ittleson | 219/76.14 |
| 6,085,417 | * 7/2000 | Anderson et al. | 29/889.1 |
| 6,109,869 | * 8/2000 | Maddaus et al. | 415/191 |

FOREIGN PATENT DOCUMENTS

| | | |
|---|---|---|
| 2012449 | 11/1990 | (CA) . |
| 2085826 | 6/1993 | (CA) . |
| 2170875 | 3/1995 | (CA) . |

OTHER PUBLICATIONS

"Laser engineered net shaping (LENS) for additive component processing" by Dave Keicher, presented at Rapid prototyping and manufacturing '96; Apr. 23–25, 1996.
"Directed light fabrication" by Gary Lewis et al., ICALEO conference 1994.

* cited by examiner

Primary Examiner—I Cuda Rosenbaum

(57) ABSTRACT

A process of the kind used for producing or repairing a turbine or compressor or fan blade by laser consolidation wherein a laser beam is moved relative to a metal surface and a stream of metal is supplied to the surface via a supply tube, so that said laser beam melts a thin layer of the metal substrate and also melts the metal being delivered to the substrate and thus forms a band of fused metal on said surface, the process being repeated until a desired blade is built up or repaired. The invention is characterized in that the laser beam is orientated at an acute angle to the surface. The supply tube may deliver the metal substantially along a path normal to the surface, with the laser beam being one of a plurality of laser beams each orientated at an acute angle to the surface and spaced around the supply means. Alternatively, a single laser beam may be used at a first acute angle to the surface, with the supply tube being at a second acute to the surface, the laser beam and supply tube being at opposite sides to the normal to the surface.

36 Claims, 3 Drawing Sheets

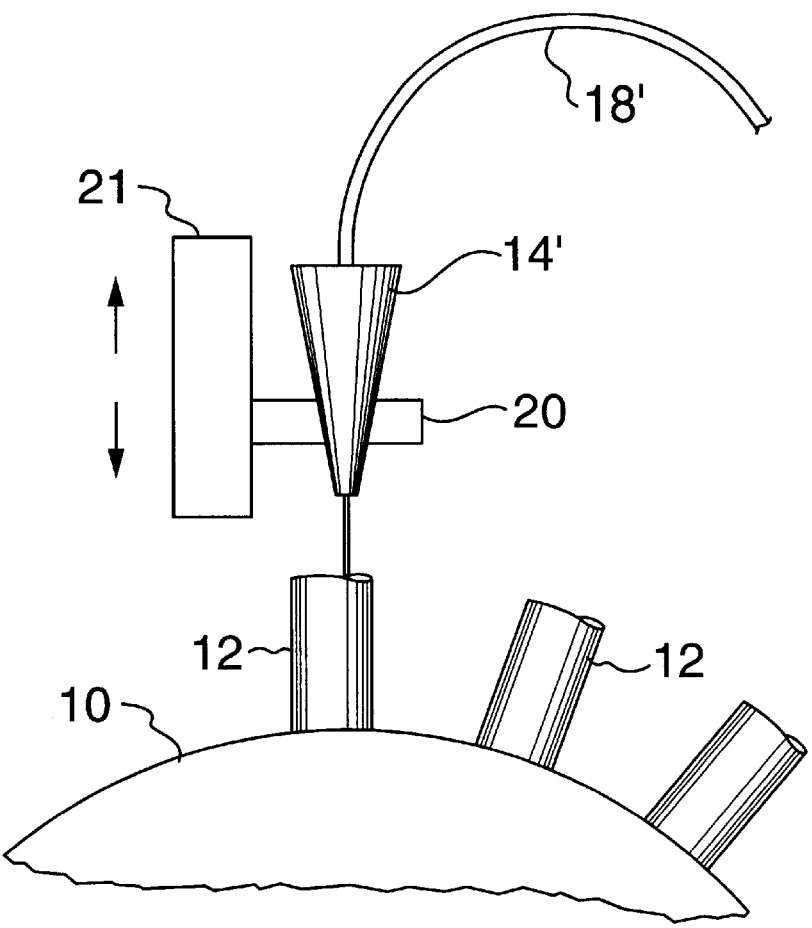
FIG. 4
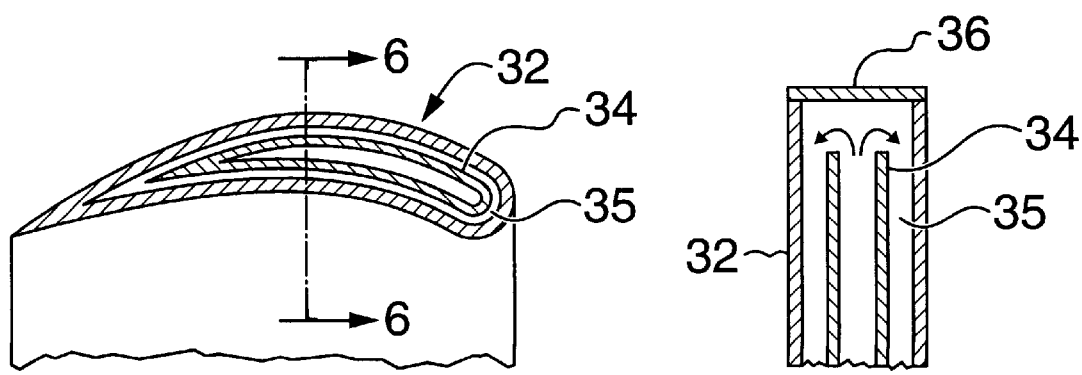
FIG. 5  FIG. 6

PROCESS FOR MANUFACTURING OR REPAIRING TURBINE ENGINE OR COMPRESSOR COMPONENTS

This application claims benefit provisonal Ser. No. 60/103,052 filed Oct. 5, 1998.

BACKGROUND OF THE INVENTION

1. Field of the Invention

The present invention relates to a process for producing or repairing components of turbine engines, especially gas turbines. The process may be used to manufacture or repair the turbine or compressor or fan blades or vanes as such, or may be used to manufacture a rotor in which the turbine or compressor blades are integrally formed with the rotor disk.

2. Prior Art

Gas turbine engines have three main sections, namely fan, compressor and turbine, each of which may have several stages connected through a central shaft. Each stage has one rotor and one stator. Each rotor used in a gas turbine engine consists of a disk fastened mechanically to a central shaft and blades of airfoil shape attached mechanically to the rim of the disk. Each stator has vanes, also of airfoil shape, attached at an outer end to the engine casing and at the inner end to a shroud. Depending on the size of the engine, each rotor and stator may contain dozens of blades or vanes. The present invention is primarily concerned with manufacture and repair of the rotor blades, especially of the turbine section, which are subject to high heat and stress, but may also be used to manufacture or repair the stator vanes. The term "turbine/compressor blades" as used herein is intended to include the turbine and compressor and also fan rotor blades, and the vanes used in the fan, compressor and turbine stages.

Normally, the blades and disk of each rotor are manufactured separately. Individual blades are made using a number of processes including hot forging, investment casting, directional solidification of melts, etc., depending on the material and functional requirements. For attaching the blades to the disks, either "dove-tail" or "fir-tree" geometry is imparted to the base of the blades, during casting or forging, and may require post machining. The disk is usually forged, and slots of suitable dove-tail or fir-tree shape for the blade attachments are machined. The final operation is the assembly of parts to form a turbine.

The turbine blades may be hollow, with acute angled holes on the leading and trailing edges as well as on the walls and tip. The cooling holes are now often drilled by a high powered Nd:YAG laser. The hollow geometry with cooling holes helps keep the blade material cooler under the operating conditions, and thereby maximises the operating life.

The conventional process for making turbine/compressor rotors has the following drawbacks:

1. The various processes of making the blades, whether by forging, investment casting, or directional solidification, and the subsequent machining, are expensive;

2. Since the blades are attached mechanically to the disks, considerable cost is involved with joint preparation, both for the joint parts of the blades and of the disk. Accurate assembly is required to maintain the desired orientation of the blades. The joints between the blades and the disks are subject to fretting fatigue at the interfaces of the joints and this reduces the life of the rotor.

3. The drilling of cooling holes in the blades is an expensive process and there are problems with drilling acute angled holes required by newer designs of blades. Also, there is a limit to the smallness of hole diameter which can be produced by laser drilling; it would be preferable to use a large number of holes smaller than those which can be drilled by a laser.

Attempts have been made to produce turbine/compressor blades by a process analogous to laser cladding or welding in which a laser is traversed over a metal surface while powdered metal is supplied to the surface so that the added metal is fused to the underlying surface. By this means layers of metal can be built up to form an article having a shape determined by a computer-guided laser and metal delivery means.

Such attempts have been made by Sandia National Laboratories, of Albuquerque, N.Mex., as described in a paper entitled "Laser Engineered Net Shaping (LENS) for Additive Component Processing" by Dave Keicher, presented at a conference entitled "Rapid Prototyping and Manufacturing '96" held by SME at Dearborn, Mich., U.S.A., in April 1996. Initially, experiments were made with a single point, off-axis (side) powder delivery nozzle, but this was found to give strong directional dependence on the deposition height. The single side powder nozzle was abandoned in favour of a co-axial powder feed in which single laser is used normal to the workpiece surface being coated and which is co-axially surrounded by a series of powder delivery tubes all feeding into the region at which the laser beam strikes the workpiece. In a later 1998 paper from the same laboratories it was stated that, with the coaxial powder feed arrangement, the best surface finish achieved was 8 micrometers Ra (roughness average) on the walls; this was after years of development.

Such attempts have been made by Sandia National Laboratories, of Albuquerque, N.Mex., as described in a paper entitled "Laser Engineered Net Shaping (LENS) for Additive Component Processing" by Dave Keicher, presented at a conference entitled "Rapid Prototyping and Manufacturing '96" held by SME at Dearborn, Mich., U.S.A., in April 1996. Initially, experiments were made with a single point, off-axis (side) powder delivery nozzle, but this was found to give strong directional dependence on the deposition height. The single side powder nozzle was abandoned in favour of a co-axial powder feed in which a single laser is used normal to the workpiece surface being coated and which is co-axially surrounded by a series of powder delivery tubes all feeding into the region at which the laser beam strikes the workpiece. In a later 1998 paper from the same laboratories it was stated that, with the coaxial powder feed arrangement, the best surface finish achieved was 8 micrometers Ra (roughness average) on the walls; this was after years of development.

Other processes for producing turbine blades by laser welding or deposition are described in the following patent publications:

U.S. Pat. No. 5,160,822, which issued Nov. 3, 1992 to Aleshin;

U.S. Pat. No. 5,900,170, which issued May 4, 1999 to Marcin, Jr., et al.;

Can. Pat. Appln. No. 2,012,449 to Rathi et al., published Nov. 15, 1990;

Can. Pat. Appln. No. 2,085,826 to Williams, published Jun. 20, 1993; and

Can. Pat. Appln. No. 2,170,875 to Goodwater et al., published Mar. 9, 1995.

In addition, U.S. Pat. No. 5,038,014, issued Aug. 4, 1991 to Pratt et al., describes a laser welding technique for making turbine or compressor blades, which is said to be suitable also for forming the rotor blades integrally with the rotor disk. The patent suggests using a conventional laser cladding process with a normal or vertical laser beam and a powder feed tube set at an angle. It is evident from tests done by applicants that there are major problems with this method:

1) The height of the airfoil will be uneven due to the multi-directional nature of the beads used to build the blade and the fact that this gives uneven deposition, and 2) The surface finish will be very poor, and it is expected that machining will be necessary.

The present invention provides a process which can be used either to produce or to repair blades of rotors or vanes of stators used in gas turbines and other turbines by addition of metal to a base using a laser process similar to those discussed above, but having different laser/metal delivery configurations. The process can produce parts with such accuracy that machining may be avoided. The basic process will be referred to herein as "laser consolidation". However, it will be noted that in the literature and patents referred to the same basic process of building a component has been referred to by many different names, e.g. "laser engineered net shaping", "directed light fabrication", "linear translational laser welding", "energy beam deposition", "sequential layer deposition", "energy beam casting", and "laser sintering". The term "laser consolidation" is intended to include processes of this type in which a laser beam is used to melt metal, delivered in powder or wire form, to a surface, to build up a shaped object by controlling movement of the beam and metal delivery means.

SUMMARY OF THE INVENTION

Broadly, the invention makes use of the fact that laser consolidation can be performed accurately enough for fabrication of turbine/compressor blades, which need little or no subsequent machining, by the processes described in our copending U.S. patent application Ser. No. 08/934,647, filed Sep. 23, 1997 now abandoned.

In accordance with one aspect of the invention, a process for producing or repairing a turbine/compressor blade by laser consolidation includes the known features of moving a laser beam relative to a surface of a metal substrate to irradiate the substrate metal and simultaneously supplying a stream of metal to the surface via supply means having a fixed relationship to the laser beam, so that the laser beam melts a thin layer of the metal substrate and also melts the metal being delivered to the substrate and thus forms a band of fused metal on the surface, and repeating this step until a desired blade is built up or repaired. The process of the invention is characterized in that the supply means delivers the metal substantially along a path normal to the surface, and in that the laser beam is one of a plurality of laser beams each orientated at an acute angle to the normal to the surface, the laser beams being spaced around the supply means.

The stream of metal may be provided by a wire, the supply means being a wire guide. Usually however, the stream of metal will be a stream of metal powder delivered through a powder tube normal to the surface being built up or repaired.

The acute angle is between 5 and 45°, and preferably the laser beams are at equal acute angles to the normal to the surface, and are equally spaced around the metal powder or wire supply means. In the preferred arrangement four of the lasers are provided spaced equally around a powder tube which forms the supply means, each at an angle of between 5 and 45° to the normal to the surface.

The metal substrate may be the periphery of a turbine or compressor or fan rotor disk, so that the process produces blades which are integral with the disk. Unlike in the Pratt et al. patent referred to above, this process will produce a finish good enough not to require post-machining, specifically being good to about 1 or 2 micrometers Ra, so that this is a very practical way of making integral disks and blades.

The process is also very useful for producing a hollow blade by controlling movement of the supply means, e.g. the powder tube, and of the laser beam, to form walls defining the blade and surrounding a cavity. Holes for cooling fluid can be formed in the walls while the blade is being built by placing a wire on a wall part which has been built, and continuing the formation of the wall around the wire, and later removing the wire to leave a bore through the wall. The wires may be quite fine, and produce holes smaller than those which can be produced by laser drilling. The process can also produce a double-walled turbine blade in which the cooling fluid is circulated in the space between the double walls.

In accordance with another aspect of the invention, the method is generally the same as described above except that instead of using a series of laser beams spaced around supply means such as a powder delivery tube normal to the surface, the supply means is slanted at a first acute angle to the normal to the surface, and a single laser beam is orientated at a second acute angle to the normal to the surface, the laser and supply means being located at opposite sides of the normal and in the same plane. Both the acute angles are preferably between 5 and 45° to the normal to the surface. In this case, a good surface finish is obtained on the side nearest the laser, but the opposite side may require post machining.

As before, the metal substrate may be the periphery of a turbine rotor disk, so that the process produces blades which are integral with the disk. The process may also repair damaged blades. Also, as before, the process may be arranged to produce a hollow blade by moving the supply means and laser beam to form walls defining the blade and surrounding a cavity. Again, holes can be formed through the hollow walls by putting wires in place during building of the wall, and later removing the wires.

BRIEF DESCRIPTION OF THE DRAWINGS

A preferred embodiment of the invention will now be described by way of example with reference to the accompanying drawings, in which;

FIG. 4 is a view of the apparatus of FIG. 3 but looking perpendicular to the plane of the disk;

FIG. 5 is a perspective view of the top portion of a double-walled hollow blade; and FIG. 6 is a sectional elevation on lines 6—6 of FIG. 5.

DETAILED DESCRIPTION

Figure 1:
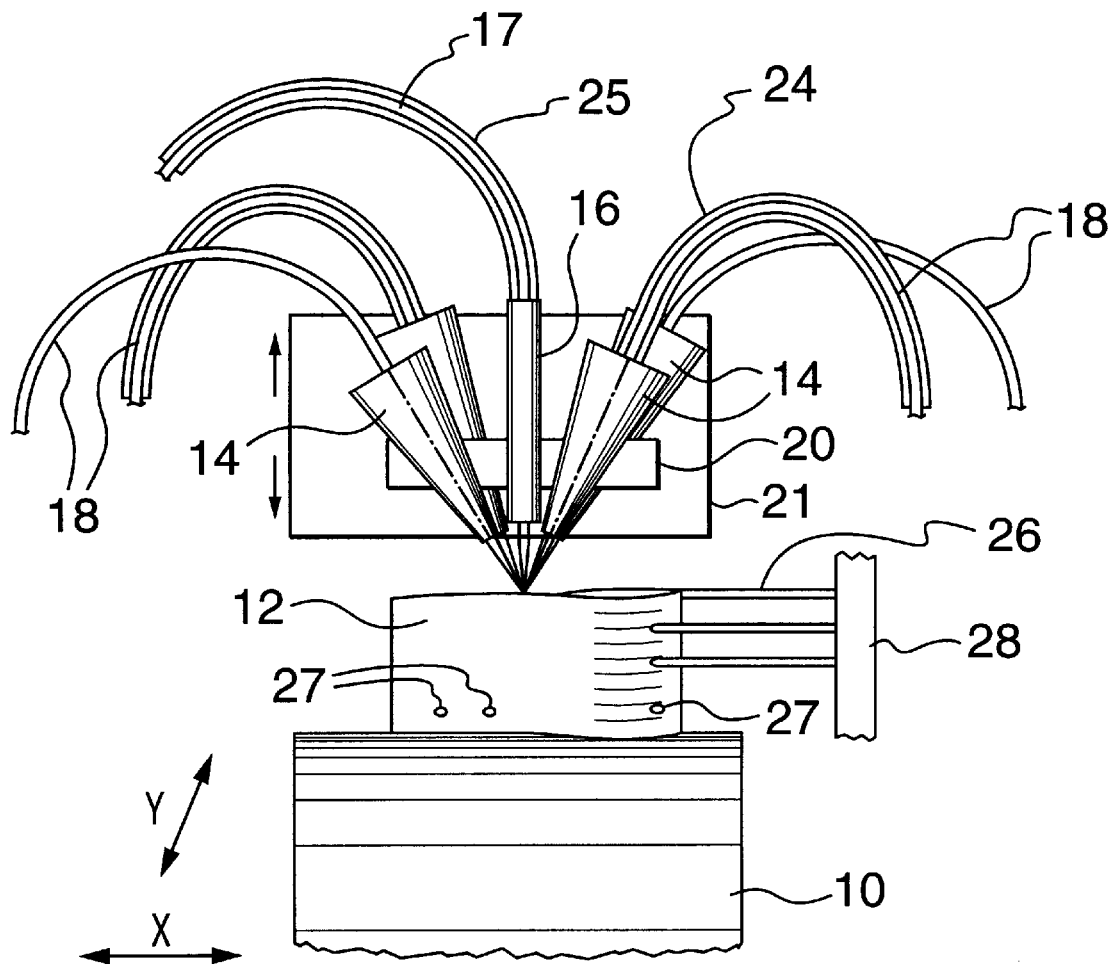
FIG. 1 is an elevation of apparatus used for producing an integral blade on a rotor disk, using four lasers, and looking along the plane of the disk.

FIG. 1 schematically shows the set-up used for this invention. The apparatus includes a rotary holder (not shown) for the disk 10 (seen edgewise in FIG. 1), the holder being of the kind having a computer controlled rotary chuck for rotating a metal workpiece such as disk 10 as blades 12 are formed integrally on the periphery of the disk The holder is mounted on a CNC (computer numerical control) table to provide horizontal translational movement both along an X axis, indicated by the arrow X in FIG. 1 and which is parallel to the axis of the disk, and along the Y axis also indicated by an arrow and which is perpendicular to the disk axis. A computer also controls rotation of the holder about the disk axis.

The arrangement of lasers and supply means in FIG. 1, which is mounted above the table, is similar to an arrangement described in Applicants' aforesaid U.S. patent application Ser. No. 08/934,647. It has four laser nozzles 14 arranged evenly around a central metal powder delivery tube 16, the lasers providing beams directed inwardly at equal inclinations to the powder tube. The powder tube is normal to the surface of the blade being produced, and is usually vertical. It is connected to a powder conduit 17. Each laser nozzle 14 is inclined inwardly so that the laser beam axes meet that of the delivery tube 16 at or close to a common location at the top of the workpiece, namely blade 12. The angle of inclination a to the vertical, which is also the normal to the surface being treated, is preferably between 5 and 45°. When viewed from the top, as in FIG. 2, the laser nozzles are spaced equally around tube 16 at 90° apart.

The laser nozzles 14 and powder tube 16 are all held in place by a holder 20 mounted on head 21. This head is fixed against movement in the horizontal plane, but is computer controlled to rise vertically as layers of material are built up on the workpiece. The head therefore provides a Z-axis component of movement, while the CNC controlled table provides horizontal movement of the disc in the X and Y directions as indicated, thus providing the necessary relative movement between the lasers and feed tube and the disk. The arrangement is such that any desired form of turbine/compressor blade can be built up on the disc 10 by suitable movements of the table the head 21, while the lasers 14 melt the surface of the workpiece and while the tube 16 supplies powdered metal to the melted area of the workpiece. During the building of a blade the disk is held against rotational movement so that the axis of the blade remains vertical; the disk is only rotated to index the disk from one blade position to the next. It may be noted that since the disk is not rotated during the building of a blade, initially the powder tube will not be quite normal to all points on the disc surface, and references to the "normal" to the surface are to be understood as being often a few degrees off the exact perpendicular angle.

In operation, the laser melts a thin surface layer of the base, or of the previously deposited metal, along with the powder being delivered through tube 16, to create a layer or band of fused metal powder of known height and width. The head 16 then raises the laser nozzles 14 and tube 16 by a predetermined amount, for example a few thousands of an inch, and a further layer is formed on the first; this time the powder and a part of the previous layer are melted. This continues until the desired height of blade is achieved.

Control of the process is through a NC (numerical control) file. A CAD (computer aided design) model of the blade, through the use of suitable software, is sliced into layers of known thickness, this being controlled by the process parameters and saved in the NC file. The program not only determines the path of movement of the laser beam and delivery tube combination relative to the workpiece held by the rotary holder, but also determines the vertical movement of the head 21 needed to produce layers which have a build-up height determined by the operating parameters.

The laser nozzles may each have a separate small laser, or all four laser nozzles may be supplied with laser light from a single laser provided with a beam splitter which divides the laser beam into four beams which are then transmitted to the laser nozzles by optical fibers 18. The lasers producing the beam are preferably of the Nd:YAG type.

The laser nozzles are connected by conduits 24, which are coaxial with the cables 18, to a source of shielding gas such as argon; this helps to protect the laser lens inside nozzle 18 from molten metal spatter, and also protects the metal being deposited from oxidation. A shielding gas is also delivered with the powdered metal along conduit 17 to the powder tube 16.

This arrangement using several lasers has the advantage of allowing control of the manner in which the workpiece is being heated. The lasers can be either all focused on the same location to concentrate the energy on a small area, or can be focused on slightly spaced areas to produce a bigger spot. In making a hollow blade, the first arrangement will produce a thin wall, and the second will produce thicker walls. When using the bigger spot, power density within the enlarged spot can be maintained at the desired level by controlling the power of the individual laser beams.

A further advantage of the multiple laser beam arrangement is that pre-heating and post-heating of the built-up layer can be accomplished in a single pass. Pre- and post-heating becomes very important when hard materials, which are sensitive to thermal shock, or materials that undergo cooling rate dependent transformations, are used for building up parts. Using this arrangement, one beam can be focused ahead of the point of build-up for pre-heating, while another beam can be made incident at a spot behind the point of build-up for post-heating and controlling the cooling rate, and the two other beams can be used for build-up of metal.

Figure 2:
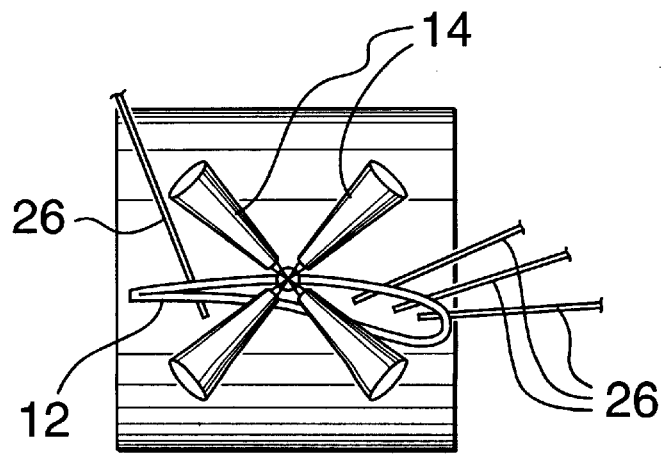
FIG. 2 is a diagrammatic top view of the apparatus of FIG. 1, showing the orientation of the lasers.

FIGS. 1 and 2 also show how holes can be produced in the walls of a hollow blade while the blade is being built up. This is done by placing wires, such as wires 26, on the top of a wall part at the positions where holes are required, and then continuing the building process around the wires. When the blade is complete the wires are pulled out to leave holes 27 of the same diameter as the wires. Wires of aluminum or copper are suitable, since they reflect much of the laser light and do not melt into the wall. Wires of quite small diameter, for example of 0.13 mm diameter can be used, to produce holes of similar diameter, which is smaller than can be produced by laser drilling. Also, wires of non-circular section, for example square, rectangular, or triangular, can be used to produce similarly shaped holes. A jig or holder, for example as indicated at 28 in FIG. 1, can be provided to hold a large number of the wires in desired orientation. With this procedure, there is no difficulty in making holes at acute angles to the wall of the blade.

Figure 3:
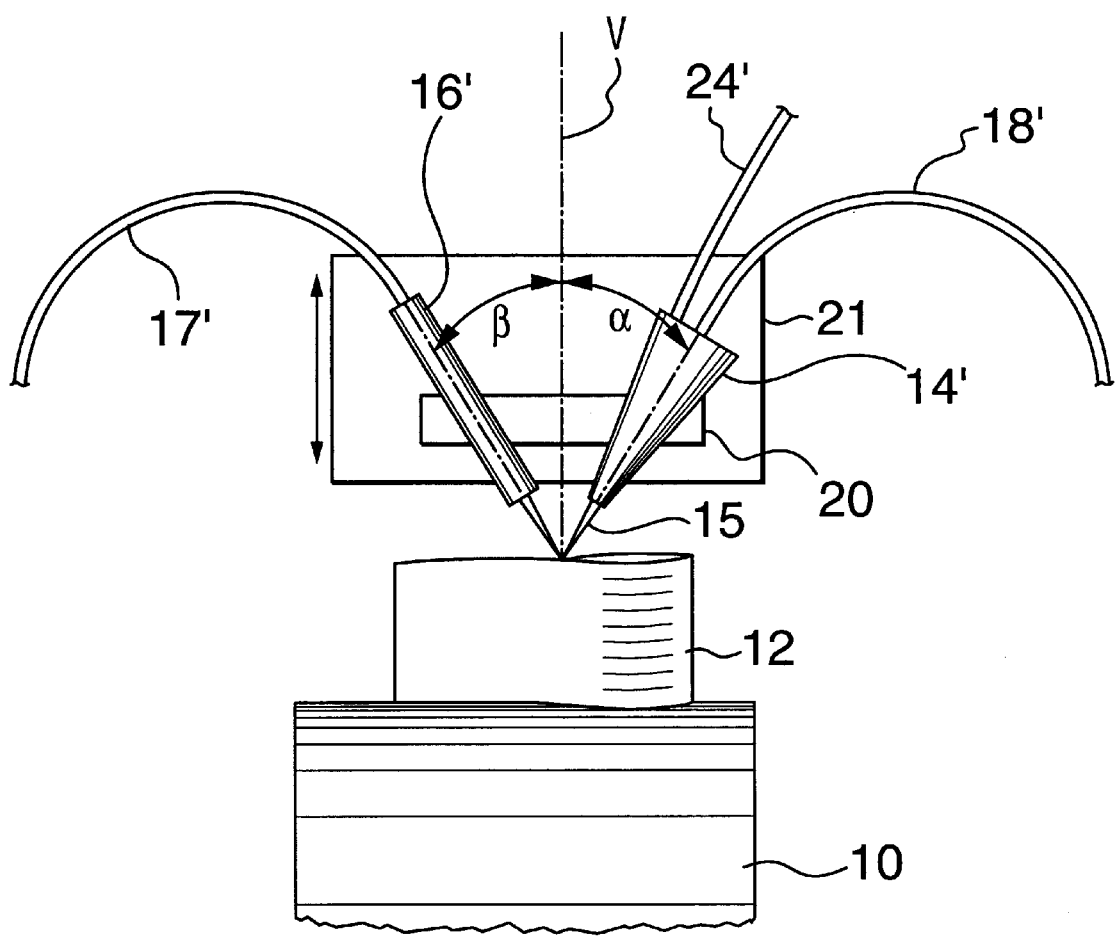
FIG. 3 is a view similar to FIG. 1 of another apparatus of the invention, this apparatus having single, separate laser nozzle and powder delivery tube.

In the alternative arrangement of FIG. 3, the disk 10 is similarly supported by a rotary and XY motion controlled table (not shown), but the arrangement of laser and powder tube are different. Here, the holder 20 and head 21 support a single laser nozzle 14' which directs a laser beam 15 inclined at an acute angle $\alpha°$ to the vertical V, and also support a metal powder delivery tube 16' which has its axis oppositely inclined at $\beta°$ to the vertical. Powder is fed to this tube by conduit 17'. The laser producing the beam is again preferably of the Nd:YAG type, mounted separately, the laser light being transmitted to the nozzle by the optical fiber 18'. The laser nozzle is connected by a separate conduit 24' to a source of shielding gas such as argon.

Hollow turbine blades have been produced with both the central powder feed/multiple laser beam process of FIGS. 1 and 2, and the single off-axis laser/off-axis process of FIGS 3 and 4, showing excellent consistency and quality in the wall thickness and heights, and with a surface finish of 1 to 2 micrometers Ra. With this type of surface finish and the final operation of shot peening required to impart compressive residual stress for improved fatigue properties, no further machining is required. Sample blades have been made using IN-625 and IN 738 metal alloy powders; both these are nickel base alloys of the type known as "superalloys" in the aircraft industry. Cobalt and iron based superalloys, and intermetallics such as titanium and nickel aluminides, may also be used.

FIGS. 5 and 6 show a double-walled hollow turbine blade 32, having an inner partition wall 34 spaced within the outer wall to provide a space 35 between the walls for the circulation of cooling gas. The space 35 is preferably connected to a return conduit for the cooling gas, which is preferably delivered outwardly through the center of the inner wall 34, as indicated in FIG. 6. After the process has been used to build up the walls, the blade is completed by welding a cap 36 across the top.

While the Nd:YAG type laser with fiber optic beam delivery has been used for this process, other lasers without fiber optic beam delivery, such as a carbon dioxide laser, a diode pumped YAG laser, or another diode laser, could also be used.

The process may also be used to repair turbine blades, which in service experience very hostile environments and undergo different kinds of damage. As they are expensive, they are repaired and reused. During an overhaul, damaged blades are taken out of the engine and sorted to select the reparable blades. The damaged area, usually on the tip for hot section blades, is removed usually by machining and repaired. Hitherto such repair has usually been made by welding. However, the processes described above are well suited to repair of blades after the damaged area has been ground away. Advantages of using this laser consolidation process for repair of worn blades, as compared to the conventional welding process, are as follows:
1. Choice of repair material; conventional welding is limited to certain weldable materials.
2. No post-machining of the shape is required; the conventional welding process requires expensive machining and hand finishing.
3. Sound metallurgical microstructure; welding process may leave porosity and cracking if not controlled properly.
4. Minimal heat affected zone, compared with welding which generally causes a large heat affected zone which deteriorates the properties of the blade material adjacent to the weld.
5. Full automation is possible, giving an economical process with improved quality.

Although in the embodiments shown the substrate for building the blades is a rotor disk, in practice the blades may also be built up on a conventional blade joint.

What is claimed is:

1. A process for producing or repairing a turbine/compressor blade by laser consolidation, comprising relatively moving a laser beam along a surface of a metal substrate to irradiate the metal substrate and simultaneously supplying a stream of metal to said surface via supply means having a fixed relationship to said laser beam, so that said laser beam melts a thin layer of the metal substrate and also melts the metal in said stream being delivered to the metal substrate and thus forms a band of fused metal on said surface, and repeating said step until a desired blade is built up or repaired;

characterized in that said stream of metal is delivered by said supply means substantially along a path coincident with a normal to the surface, and in that said laser beam is one of a plurality of laser beams each orientated at an acute angle to the normal to the surface, said laser beams being spaced around the stream of metal.

2. A process according to claim 1, wherein said acute angle is between 5 and 45°.

3. A process according to claim 1, wherein the laser beams are orientated at equal acute angles to the normal to the surface.

4. A process according to claim 1, wherein the laser beams are equally spaced around the stream of metal.

5. A process according to claim 1, wherein four said laser beams are provided spaced equally around said stream of metal, each orientated at an angle of between 5 and 45° to the normal to the surface.

6. A process according to claim 1, wherein the said path coincident with a normal to the surface is centrally situated relative to the laser beams.

7. A process according to claim 1, wherein the metal substrate is the periphery of a turbine or compressor or fan rotor disk, and wherein the process produces blades which are integral with said turbine or compressor or fan rotor disk.

8. A process according to claim 1, wherein the process is arranged to produce a hollow blade by movement of said supply means and laser beams relative to said surface to form walls defining said blade and surrounding a cavity.

9. A process according to claim 8, wherein after part of a said wall of said blade has been formed, a wire is placed on said part of said wall, and the formation of the wall continues around the wire, and including the step of later removing the wire to leave a bore through the wall.

10. A process according to claim 1, wherein the stream of metal is powdered metal delivered by a powder tube supplying said powdered metal to the surface.

11. A process according to claim 10, wherein the powdered metal is an iron or nickel or cobalt based superalloy.

12. A process according to claim 10, wherein the powdered metal is an intermetallic.

13. A process for producing or repairing a turbine/compressor blade by laser consolidation, comprising relatively moving a laser beam along a surface of a metal substrate to irradiate the metal substrate and simultaneously supplying a stream of metal to said surface via a supply means having a fixed relationship to said laser beam so that said laser beam melts a thin layer of the metal substrate and also melts the metal in said stream being delivered to the metal substrate and thus forms a band of fused metal on said surface, and repeating said step until a desired turbine blade is built up or repaired;

characterized in that said stream of metal delivered by said supply means is orientated at a first acute angle to a normal to the surface, and in that said laser beam is orientated at a second acute angle to the normal to the surface, said laser beam and stream of metal being located at opposite sides of the normal to the surface.

14. A process according to claim 13, wherein said acute angles are between 5 and 45° to the normal to the surface.

15. A process according to claim 13, wherein the metal substrate is the periphery of a turbine rotor or compressor or fan disk, and wherein the process produces blades which are integral with said turbine rotor or compressor or fan disk.

16. A process according to claim 13, wherein the stream of metal is powdered metal delivered by a powder tube supplying said powdered metal to the surface.

17. A process according to claim 16, wherein the powdered metal is an iron or nickel or cobalt based superalloy.

18. A process according to claim 16, wherein the powdered metal is an intermetallic.

19. A process for making a turbine/compressor blade or fan blade integrally with a disk, comprising the steps of:

providing a disk having a substrate surface at its periphery; delivering substantially along a normal to the surface a stream of metal impacting an area of the surface, providing a plurality of laser beams each at an acute angle to the normal of the surface, said laser beams impinging on said area and causing the metal to adhere to the surface, and moving the surface relative both to the stream of metal and the laser beams to produce a series of layers of molten metal in a pattern corresponding to successive cross sections of the blade until the blade is formed.

20. A process according to claim 19, wherein four said laser beams are provided spaced equally around said stream of metal, each laser beam being at an angle of between 5 and 45° to normal to the surface.

21. A process according to claim 19, wherein the process is arranged to produce a hollow blade by moving said supply means and laser beams relative to said substrate surface to form walls defining said hollow blade and surrounding a cavity.

22. A process according to claim 21, wherein after part of a said wall of said blade has been formed, a wire is placed on said part of said wall, and the formation of the wall continues around the wire, the process including the step of later removing the wire to leave a bore through the wall.

23. A process according to claim 19, wherein the stream of metal is powdered metal delivered by a powder tube supplying said powdered metal to the surface.

24. A process according to claim 23, wherein the powdered metal is an iron or nickel or cobalt based superalloy.

25. A process according to claim 23, wherein the powdered metal is an intermetallic.

26. A process for making a turbine or compressor or fan blade integrally with a disk, comprising the steps of:

providing a disk having a substrate surface at its periphery, delivering at a first acute angle to a normal to the surface a stream of metal impacting an area of the surface, providing a laser beam at an acute angle to the normal to the surface, said laser beam impinging said area and causing the metal to adhere to the surface, said laser beam and stream of metal being on opposite sides of the normal to the surface, and moving the surface relative both to the stream of metal and the laser beam to produce a series of layers of molten metal in a pattern corresponding to successive cross sections of the blade until the blade is formed.

27. A process for making a turbine blade according to claim 26, wherein said acute angles are between 5 and 45° to the normal to the surface.

28. A process according to claim 26, wherein the process is arranged to produce a hollow blade by moving said supply means and laser beam relative to said substrate surface to form walls defining said hollow blade and surrounding a cavity.

29. A process according to claim 28, wherein after part of a said wall of said blade has been formed, a wire is placed on said part of said wall, and the formation of the wall continues around the wire, the process including the step of later removing the wire to provide a bore through the wall.

30. A process according to claim 26, wherein the stream of metal is powdered metal delivered by a powder tube to the surface.

31. A process according to claim 30, wherein the powdered metal is an iron or nickel or cobalt based superalloy.

32. A process according to claim 30, wherein the powdered metal is an intermetallic.

33. A process according to claim 10, wherein the powdered metal is an intermetallic selected from the group consisting of titanium and nickel aluminide.

34. A process according to claim 16, wherein the powdered metal is an intermetallic selected from the group consisting of titanium and nickel aluminide.

35. A process according to claim 23, wherein the powdered metal is an intermetallic selected from the group consisting of titanium and nickel aluminide.

36. A process according to claim 30, wherein the powdered metal is an intermetallic selected from the group consisting of titanium and nickel aluminide.

\* \* \* \* \*